UNITED STATES PATENT OFFICE.

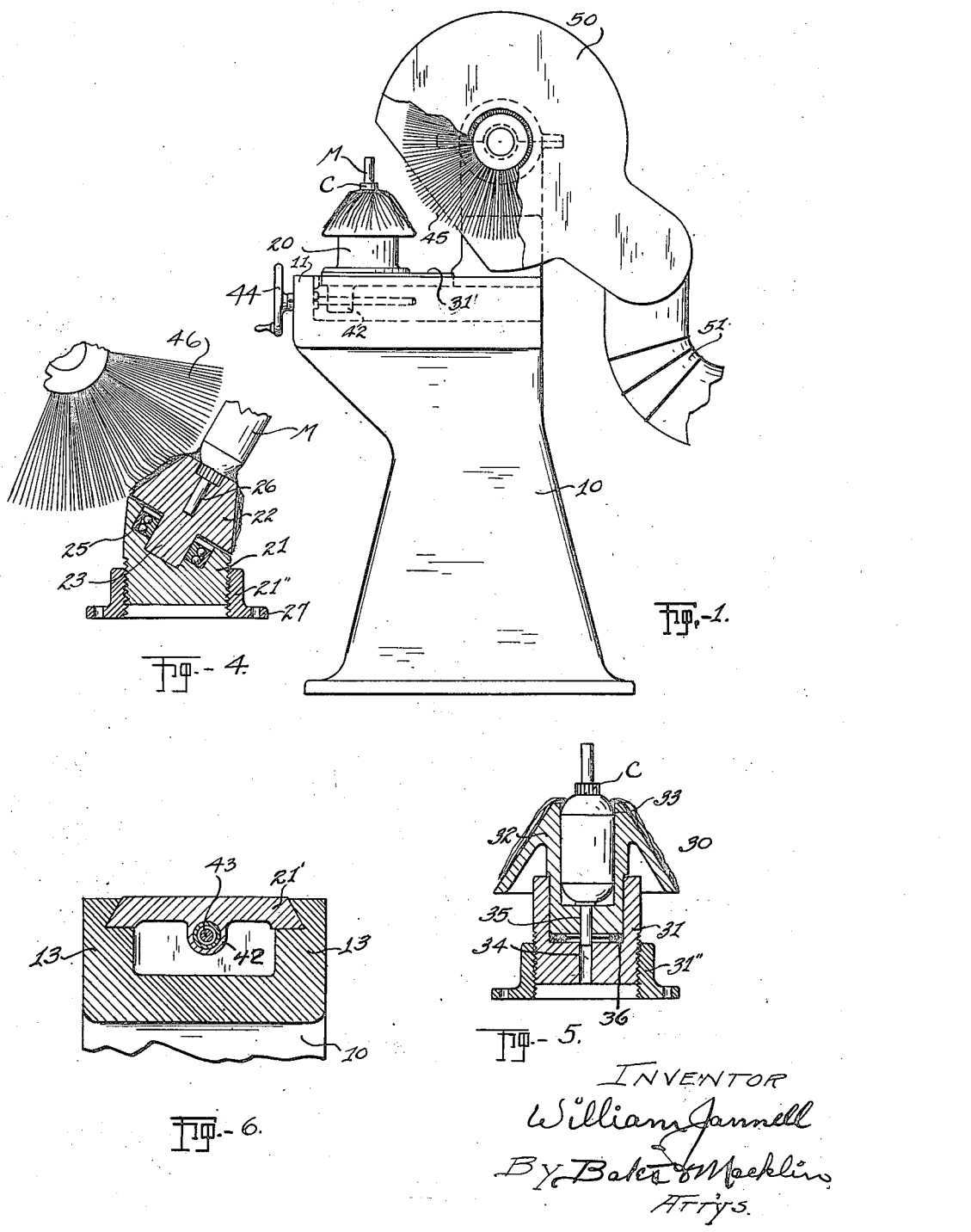

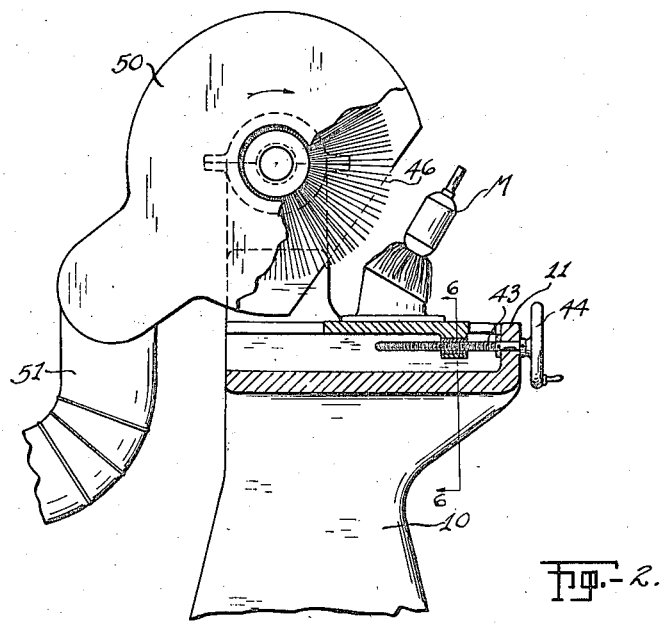
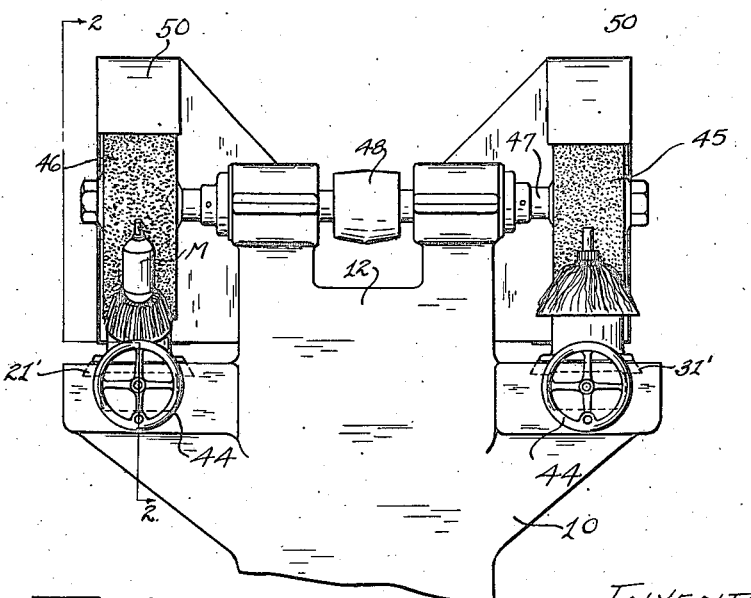

WILLIAM JANNELL, OF WEST PARK, OHIO, ASSIGNOR TO THE DOMESTIC ELECTRIC COMPANY, OF CLEVELAND, OHIO, A CORPORATION OF OHIO.

WIRE-INSULATING STRIPPER.

1,424,482.   Specification of Letters Patent.   Patented Aug. 1, 1922.

Application filed February 26, 1921. Serial No. 448,277.

*To all whom it may concern:*

Be it known that I, WILLIAM JANNELL, a citizen of the United States, residing at West Park, in the county of Cuyahoga and State of Ohio, have invented a certain new and useful Improvement in Wire-Insulating Strippers, of which the following is a full, clear, and exact description, reference being had to the accompanying drawings.

My invention relates to a device for stripping insulation from the wire of an armature.

In the manufacture of small size motors, such, for instance, as those employed in different domestic electric appliances, it is imperative that each step in the manufacture shall be quickly and efficiently performed, in order to make it possible to manufacture these motors at a profit.

The principal object of my invention is to provide a method whereby the insulation may be quickly removed from the ends of the armature wires of such motors prior to their connection with the plates of the commutator and a device for carrying out this process. Another object is to provide such a device simple in construction and operation. Another object is to provide a device having receiving means for holding the armature so as to protect it while completely removing the insulation from the ends of the wires. Other objects will be apparent in the course of the following description and the features of novelty of both the process and apparatus will be set forth in the claims.

In the drawings in which a novel device for carrying out my process is illustrated, Fig. 1 is an end view of the device; Fig. 2 is a side view taken on the line 2—2 of Fig. 3 looking in the direction of the arrows; Fig. 3 is a fragmentary front view of the machine; Fig. 4 is a longitudinal section of one of the armature holding members showing the stripping brush in operative relation therewith; Fig. 5 is a similar view of the other armature holding member, and Fig. 6 is a fragmentary section taken on the line 6—6 of Fig. 2.

In the drawings, 10 represents the frame of the machine, which carries slidably dovetailed therein sliding bases 21′ and 31′ of the armature carrying members 20 and 30.

These carrying members 20 and 30 are designed to receive the armatures, whose wires are to be stripped and to present them to stripping wheels 45 and 46 respectively, which are rotatably mounted on a horizontal axis at the rear of the frame 10.

The carrier 20 is shown as comprising the slide 21′, the boss 21″, the base 21 and the rotatable carrier 22. The base 21 is preferably adjustable in the boss 21″. This may be conveniently accomplished by threading the two members as shown and serves as a means for correctly adjusting the conical face of the rotatable member 22 with relation to the wire stripping wheel 46.

The boss 21″ may be made integral with the slide 21′ or may be provided with suitable means such as the flange 27 having openings therein to allow passage of suitable attaching screws whereby this member may be attached to the slide. The member 22 is rotatably mounted about an inclined axis by means of the stem 23 which is inserted in a recess in the base 21. A suitable bearing 25 may be provided about the stem to reduce friction.

The adjustability of the base 21 on the boss enables the carrier to be properly adjusted for bringing the conical face of the carrier into proper position with relation to the stripping wheel.

The rotatable carrier 22 has a recess 26 formed therein adapted to receive the shaft and commutator of a small armature M. This member has a conical face adapted to receive the ends of the armature wires. The inclination of the axis of this member away from the stripping wheel serves to hold the outer portion of the armature out of contact with the wheel 46, when the conical face is brought in contact with this wheel as shown in Fig. 4.

The carrying member 30 is similar to carrier 20 and comprises a slide 31′, a boss 31″, a base 31 and a rotatable carrier 32 which is provided with a conical face. These members may be connected in a manner similar to that described in regard to the carrier 20. However, it will be noticed that the member 32 instead of being mounted on an inclined axis is shown as having its axis of rotation, vertical. The member 32 is also provided with a large opening 33 adapted to entirely receive a small armature therein but to leave the shaft therein extending out of the recess.

Registering openings 34 and 35 may be formed in members 31 and 32 respectively and receive the other end of the armature shaft (see Fig. 5). The member 32 is rotatably mounted in the member 31, suitable bearings 36 being provided to reduce friction. This carrying member 32, as shown, is mounted so as to have its axis extend vertically, although it might also be mounted at an incline. However, since the armature will be completely protected there is no occasion to incline the axis to prevent the armature from coming in contact with the wheel brush.

The slides 21' and 31' may each be slidably dovetailed in the ribs 13 upstanding from the bed of frame 10 as is clearly illustrated in relation to the slides 21' in Fig. 6.

Each of these slides 21' and 31' may be provided with means, such as the threaded lugs 42 each adapted to receive a screw stem 43. Each screw stem has an unthreaded portion passing through a flange 11 of the frame and may have a hand wheel 44 pinned thereon. Suitable collars are shown pinned on this shaft adjacent each side of this flange 11, which prevent longitudinal motion of the screw stems.

By means of these hand-wheels and stems, each of the carrying members may be moved toward or away from the insulator removing means herein shown, as comprising the wire wheels 45 and 46 which are attached to the horizontal shaft 47 which may be suitably journaled in a standard 12 at the rear of the frame. A suitable means, such as the pulley 48 is provided for rotating this shaft and the wheels.

In addition to the adjustment by means of the hand wheels and stems, the carrier is also adjustable in a vertical direction so as to place it in position such that the motion of the slides will bring them into operative relation with the stripping wheels. This latter adjustment may be referred to as a more or less permanent adjustment since if the bases have been properly positioned they require no further adjustment in a vertical direction but will be moved into proper relation with their stripping wheels by means of the action of the slides.

The removability of the bases of the carriers from the boss also adapts the machine to be readily used with armatures of varying sizes, by merely replacing these parts.

As the wires employed in the armatures are quite delicate it is necessary that the wires of the stripping wheel be also made fine enough so as to prevent tearing or breaking of the armature wires.

Each stripping wheel as it operates upon the wires will not only strip the insulation therefrom, but will comb the wires out along the surface of the carrier in regular order. This facilitates the placing of the wire in proper position on the surface of the second carrier and the operation of the second stripping wheel leaves the wires in position ready to be rapidly inserted and secured in the commutator slots.

Casings 50 may be provided to surround the major portion of each of the stripping wheels. Each casing is open in front to allow approach of the work carrying members. To each of these casings may be attached a suction connection 51 for drawing away the waste from the wires, which will be thrown into the casings by the action of the wheels.

The machine is adapted to operate to remove the insulation from the ends of the wires of a small armature after the armature has been wound and previous to inserting these wires in and connecting them to the commutator plates.

In carrying out the process by the use of the apparatus shown, the armature M is taken with its wires hanging at the commutator end thereof and it may be inserted first either into the carrier 22 or the carrier 32.

If it is placed in the carrier 22, the operator holds the commutator end C of the motor up so as to allow the wires to extend around the armature. He then grasps the armature and wires in his hand and inverts the armature and places it in the recess 26 of the member 22. When he then releases the wires, it will be seen that they will fall about the conical face of this member in the position shown in Fig. 2, and may be further positioned by the operator by moving his hand downward along the conical surface to smooth out the wires therealong.

These wires are fine and rather delicate and the insulation about them consists of silk and some form of filler such as lacquer. If the carrier 22 is now moved toward the stripper 46, when the wire wheel is rotating in the direction indicated by the arrow in Fig. 2, comes in contact with the surface of the cone, it will flatten out along this surface and strip the insulation from the wires, which are lying on this portion of the cone (see Fig. 4). However, it may leave the insulation on a small portion of the wire lying adjacent the conical face.

The operator by grasping the upper end of the armature shaft between his fingers may now slowly rotate the carrier 22 so as to strip the insulation from all the wires.

When the cone has been completely rotated so as to bring all of the wires in contact successively with the wheel 46, the carrier may be retracted and the armature removed therefrom. The operator takes the armature to the other carrier 32 and inverts it end for end, placing the commutator upward. He then allows the wires to fall over the conical face of member 32 in position to be moved up into contact with the stripper 45. This motion is accomplished by means of the hand wheel 44. When the brush is in contact with the wires the operator rotates the member 32 thereby bringing all the wires successively in contact with the wheel 45. The wheel 45 serves to remove any insulation which may not have been cleared away by the wheel 46. Since the carrier 32 forms a shield for the armature, this carrier need not be inclined from the wheel in order to protect the armature.

It will, of course be understood that the machine is so arranged that it may be operated by a single operator, or an operator may be stationed adjacent each hand wheel so that the armatures having been operated upon in one of the carriers may then be transferred to the other operator to have the stripping of the insulation completed.

It will be noticed that the portion of a wire which must have the insulation cleared from it is a small length near the armature and the conical carrier members are so placed that the portion of the cone face on which this part of the wire lies comes into contact with the brush first to insure stripping of the insulation from this portion of the wire.

It will be seen that I have provided a means and a method whereby insulation can be very rapidly removed from the wires in a machine whose operation is exceedingly simple. The machine is also composed of very few parts and may be very cheaply manufactured.

While I have described a specific device embodying the principles of my invention, it will be apparent that many different devices might be made, which would involve the principles thereof, and therefore, the description is to be taken as illustrative of a particular embodiment of the invention rather than as restrictive of its character and scope.

For instance, while I prefer to make the wire bearing surfaces of the members 22 and 32 conical in form, it is evident that the surface may be any suitable surface of revolution.

I claim:—

1. In a device of the class described, a carrier having a wire spreading face, and means for retaining a portion of an armature therein.

2. In a device of the class described, a carrier having a face in the form of a surface of revolution and means for retaining a portion of an armature therein.

3. In a device of the class described, a base, a member having a wire spreading face rotatably mounted in said base, means for retaining a portion of an armature in said member with the ends of the wires spread on said face.

4. In a device of the class described, a base, a member rotatably mounted therein and having a recess adapted to receive an armature, and a face comprising a surface of revolution surrounding said recess and adapted to receive the armature wire.

5. The method of stripping insulating wires, which comprises arranging said wires on a bearing surface, and thereafter brushing said wires along said surface.

6. The method of stripping insulating wires, which comprises arranging said wires on a bearing surface, thereafter rapidly brushing said wires with a delicate wire brush.

7. The method of stripping insulating wires, which comprises arranging said wires on a surface of revolution, and bringing a portion of said wires successively into operative relation with a rotary brush to strip the insulation from the wires.

8. In an apparatus for stripping insulating material from the ends of armature wires, a rotatable member having a recess to receive an armature and an exposed surface for holding the ends of the armature wires of a brush adapted to cooperate with said surface whereby a rotation of the member may successively bring the elements of the surface in operative relation with the engaging portion of the brush.

9. In an apparatus for stripping insulating material from the ends of armature wires, a rotatable member having a recess to receive one end of an armature, an exposed surface to receive the ends of the armature wires, and a stripping means adapted to be brought into operative relation with the elements of said surface, a second rotatable member having a recess therein, and an exposed surface thereon, said recess being adapted to receive the other end of the armature, and said surface being adapted to receive the ends of the armature wires, whereby the rotation of said rotary member brings the element of said surface successively in operation with the stripping means.

10. In a device of the class described, a base member, a carrying member having a wire receiving face rotatably mounted on an inclined axis on said base and having an armature receiving recess therein.

11. In a device of the class described, a carrier having a recess adapted to receive an armature, a face surrounding said recess and adapted to receive the armature wire, and an insulator stripping means adapted to cooperate with said face.

12. In a device of the class described, a rotatably mounted member having an armature receiving recess and a wire receiving face, a stripping wheel, and means for moving said rotatable member into operative relation with said wheel.

13. In a device of the class described, a stripping wheel, a rotatably mounted member having an armature receiving recess and a wire receiving face, said face being symmetrical with respect to the axis of the rotatable member, and means for moving said member to bring said face into operative relation to the stripping wheel.

14. In a device of the class described, an insulator stripping means, a carrying member having a conical wire receiving face and a recess in said member adapted to receive an armature, a base in which said carrier is rotatably mounted, and means for moving said base to bring the face of said carrier into operative relation with said insulator stripping means.

15. In an insulator stripper, a rotatably mounted member having an armature receiving recess and a conical wire receiving face, the axis of rotation of said member being coincident with the axis of the conical face, a stripping wheel and means for moving the face of said rotatable member into operative relation with said wheel.

16. In a device of the class described, the combination of a stripping wheel, a sliding base, a rotatable member carried thereby and having a recess adapted to receive and protect an armature, a face surrounding said recess to receive the wires of said armature and means for moving said face into contact with said wheel.

17. In a device of the class described, a base, a member rotatably carried thereby and having a conical wire receiving face and an end central of said face, said end having a recess adapted to conform to the shaft and commutator of a small armature, whereby the armature may be placed therein with its wires resting on said conical face.

18. In a device of the class described, a base, a member rotatably carried thereby and having a conical wire receiving face, a recess in said member adapted to receive an armature, and registering recesses in said member and base adapted to receive the armature shaft.

19. In a device of the class described, a frame, a member slidably mounted thereon and carrying a rotatable armature holding member thereon and a stripping wheel having a yieldable surface wheel adapted to cooperate with said carrier to remove insulation from the wires of the armature.

20. In a device of the class described, a frame, a member slidably mounted therein and carrying a rotatable armature holding member thereon and a wire wheel adapted to cooperate with said carrier to remove insulation from the ends of the wires of the armature.

21. In a device of the class described, a frame, members slidably mounted therein and each carrying a rotatable armature holding member, a shaft journaled in said frame and having a stripping wheel at each end, and means for sliding said members into and out of operative relation with said wheels respectively.

22. In a device of the class described, a frame, bases slidably mounted therein, a rotatable armature holding member, carried by each of said bases, and each having an armature receiving recess and a wire receiving face, a shaft journaled in said frame and having a stripping wheel at each end, and means for sliding said wire receiving faces into and out of operative relation with said wheels.

23. In a device of the class described, a rotary stripping means, a carrier member having a face in the form of a surface of revolution, a base on which said carrier is rotatably mounted, means for moving said carrier in one direction toward and from the stripping means and means for adjusting the position of said carrier in a transverse direction.

24. In a device of the class described, a carrier member having a face in the form of a surface of revolution, a recess in said member adapted to receive an armature, a base on which said carrier is rotatably mounted, a rotating stripping wheel, means for moving said carrier toward and away from said wheel in one direction in the plane of said wheel and means for moving said carrier in a transverse direction in the same plane whereby the face of said carrier may be brought into operative relation with said wheel.

In testimony whereof, I hereunto affix my signature.

WILLIAM JANNELL.